United States Patent

Wallick

[11] Patent Number: 5,919,717
[45] Date of Patent: Jul. 6, 1999

[54] RECYCLED FIBER YARN AND METHOD FOR MAKING SAME

[76] Inventor: Judith L. Wallick, P.O. Box 1522, Stowe, Vt. 05672

[21] Appl. No.: 08/798,310

[22] Filed: Feb. 7, 1997

[51] Int. Cl.[6] .................................................. B41M 3/12
[52] U.S. Cl. .......................... 442/334; 19/66 R; 28/100; 28/299; 57/400; 428/903.3; 428/364; 428/395; 442/334; 442/402
[58] Field of Search .............................. 19/66 R; 28/100, 28/299; 428/903.3, 364, 395; 442/402, 334; 57/400

[56] References Cited

U.S. PATENT DOCUMENTS

| 3,937,675 | 2/1976 | Gruntfest | 260/2.3 |
| 4,003,880 | 1/1977 | Sidebottom | 260/75 T |
| 5,331,801 | 7/1994 | Heifetz | 57/400 |

*Primary Examiner*—James J. Bell
*Attorney, Agent, or Firm*—Notaro & Michalos P.C.

[57] ABSTRACT

A recycled yarn or non-woven product and method for making the same, the yarn or non-woven product being made from recycled polyester fiber or fleece fabric.

21 Claims, 3 Drawing Sheets

RECYCLED FIBER YARN AND METHOD FOR MAKING SAME

FIELD AND BACKGROUND OF THE INVENTION

The present invention relates to a yarn and a method of making same and, more particularly, to a yarn made from recycled polyester fiber and/or polyester microfiber napped (fleece) textile waste.

Millions of pounds of textile waste are produced annually in the manufacturing of clothing and other textile products. A large percentage of the textile waste is accounted for by polyester.

Disposal of such large volumes of solid waste is an increasing problem for the apparel industry. The rising costs, reduction of available space and concern for the environment are making burying and landfilling the textile waste dwindling options.

Concomitantly, the world is facing a shortage of raw materials for thermoplastic polymer, particularly polyester polymer.

Potential methods of recycling polyester fabric have been pursued. Wasted polyester scraps can be recycled for reuse by various processes. It is known that polyesters can be dissolved in solvents and solvent systems.

A process has been disclosed in U.S. Pat. No. 4,003,880 providing a method whereby dye-stripping, separation, and recovery are combined in such a way as that the dye-stripping phase actually constitutes the first step of the dissolution and separation phase. After the dye-stripping is completed, the fibers remain saturated with a dye-stripping solvent, which can also be used for dissolution of the polyester. The dissolution of the polyester and its subsequent precipitation and separation from the solvent serves to complete the dye removal in addition to the separation and recovery of the polyester.

A process is disclosed in U.S. Pat. No. 3,937,675. In the disclosed process, textile waste formed of blended cellulose and polyester fibers are treated with a mineral acid agent such as sulfuric acid, under conditions which serve to hydrolyze the cellulose and convert it to a form which is readily removed from the polyester fibers while leaving the polyester fibers substantially unaffected. The cellulosic material is recovered in the form of fibrets adapted for use as such or for treatment in producing other cellulosic compounds whereas the polyester fiber recovered may be garnetted for reuse in either spun yarn manufacture or in nonwoven processes.

These processes have created environmental concerns. Further, these processes are very expensive operations and have not met commercial success. Added expense is incurred due to the f act that the recovered materials must be dried. Further, these processes are slow and suitable only for laboratory usage.

Accordingly, there is a need for an economical and environmentally safe method for recovering polyester fibers in useful forms from polyester textile waste.

It is an object of this invention to provide a method for recovering polyester fibers in useful forms from textile waste. It is another object of this invention to provide a method for recycling the polyester fibers which avoids using chemical solvents which are hazardous to the environment. These and other objects of the invention will be apparent to one skilled in the art as the description thereof proceeds.

SUMMARY OF THE INVENTION

The present invention relates to a yarn and a method of making same which is an effective and economical means of recycling polyester fabric, particularly polyester microfiber fleece fabric.

In particular, the present invention discloses a method for pulling apart polyester and/or fleece textile remnants into an open, blendable fiber of long enough staple length to successfully re-spin the resulting fiber into yarn. The method to recycle the polyester fabric includes the steps of (a) cutting polyester scraps into cut pieces; (b) collecting the cut pieces (c) transporting the cut pieces to be shredded to a tearing machine; (d) shredding the cut pieces in the tearing machine to form shredded fibers; (e) blowing out the shredded fibers to help form a batting of fibers; (f) carding the batting of fibers; (g) extruding the batting of fibers to form a sliver; and (h) spinning the sliver into a yarn.

The tearing machine may comprise one or many successive rotary-tearing drums. The drums are generally equipped with teeth which shred and pull apart the polyester fiber.

The number of drums is a function of the desired degree of refining. The preferred number of drums is from four to six drums; more preferably five drums. If the number of drums is less than four, the polyester fiber won't be sufficiently opened up and thus will have lumps which cannot be spun. If the number of drums is greater than six, the polyester fiber will be torn into too short confetti pieces which also cannot be spun.

The area of the cut pieces is typically from about two square inches to four square inches; more preferably, from about 2.5 square inches to about 3.5 square inches; and most preferably, about 3 square inches.

The length of the shredded fibers is typically from about 0.5 inches to 1.5 inches; more preferably, from about 0.75 inches to about 1.25 inches; and most preferably, about one inch.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Brief Description of the Drawings

The polyester fabric or fleece may be collected from various sources, including, but not limited to, cut and sew waste from manufacturers, spinning waste from manufacturers and post-consumer garments. It is noted that foreign materials should be removed from such sources, including metallic objects such as zippers and buttons.

Figure 1:
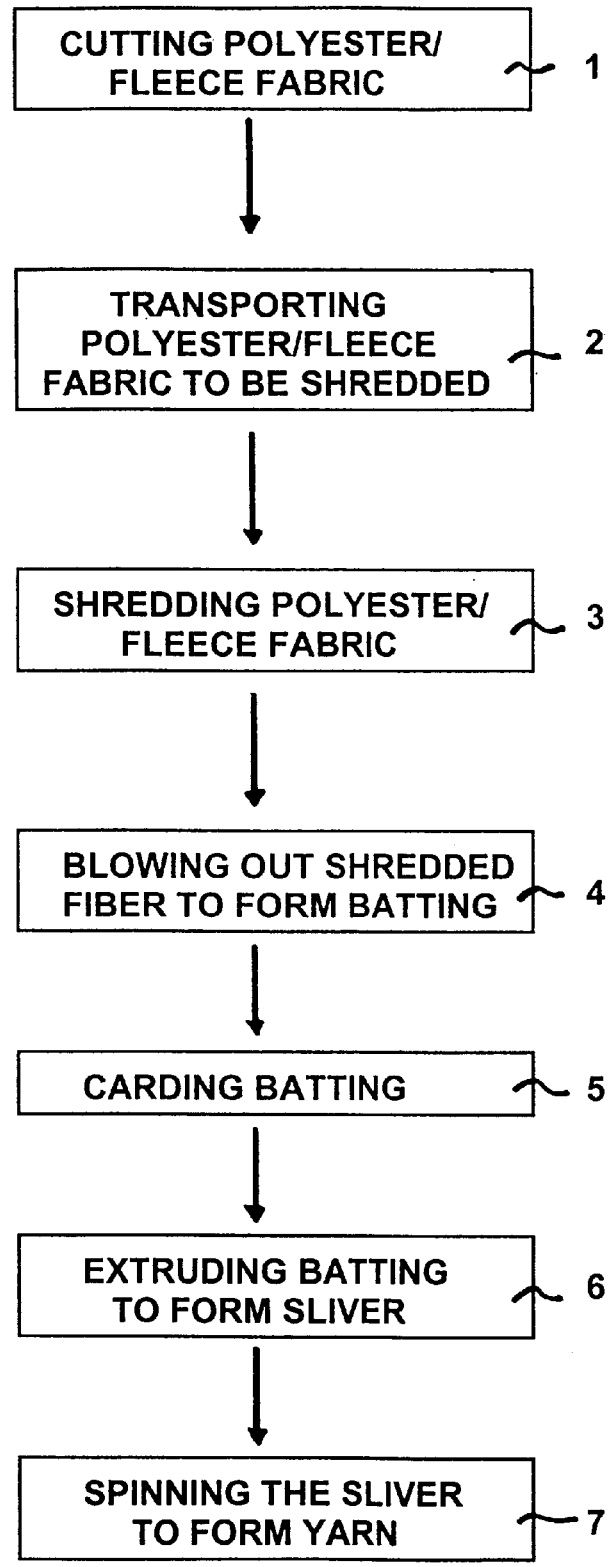
FIG. 1 is a flow chart of the steps comprising the method.

Referring to FIG. 1, the first step 1 is cutting the polyester fabric or fleece into pieces. The polyester fabric or fleece may be cut in a variety of ways, including use of a bale cutter, a rotary knife or a pneumatic knife.

The second step 2 is transporting the pieces to be shredded.

The third step 3 is shredding the pieces into shredded fibers. This step is also known as picking, tearing or garnetting in the art.

The fourth step 4 involves blowing air through and along the shredded fibers to help propel them and form a batting of fiber. This is also known as blowing the fiber for transporting the fiber. This step may alternatively form a mass of fibers that can be collected in a bale for later processing.

The fifth step 5 is carding the batting of fibers or mass of fibers. The carding aligns the fibers parallel and is preferably performed by using a synthetic card wire.

The sixth step 6 is extruding the batting of fibers to form a sliver. The sliver can directly result from the carding step, however.

The seventh step 7 is spinning the sliver to form a yarn. The yarn is composed of the recycled polyester fabric or fleece fabric.

In another embodiment, the method further comprises blending the batting of fibers with natural fibers to form a blended fiber. The blending may be done in a hopper.

The volume ratio of the batting of fiber to the natural fibers in the blended fibers is typically from about 1:1 to 10:1; preferably, is from about 2:1 to about 5:1; more preferably, about 4:1.

In another embodiment, the natural fibers have an average length equal to the average length of the fiber in the batting of fiber.

In another embodiment, the shredded strips are blended with synthetic fibers.

In another embodiment, the method further comprises spraying anti-static finish on the shredded strips before the airing out of the shredded strips.

Figure 2:
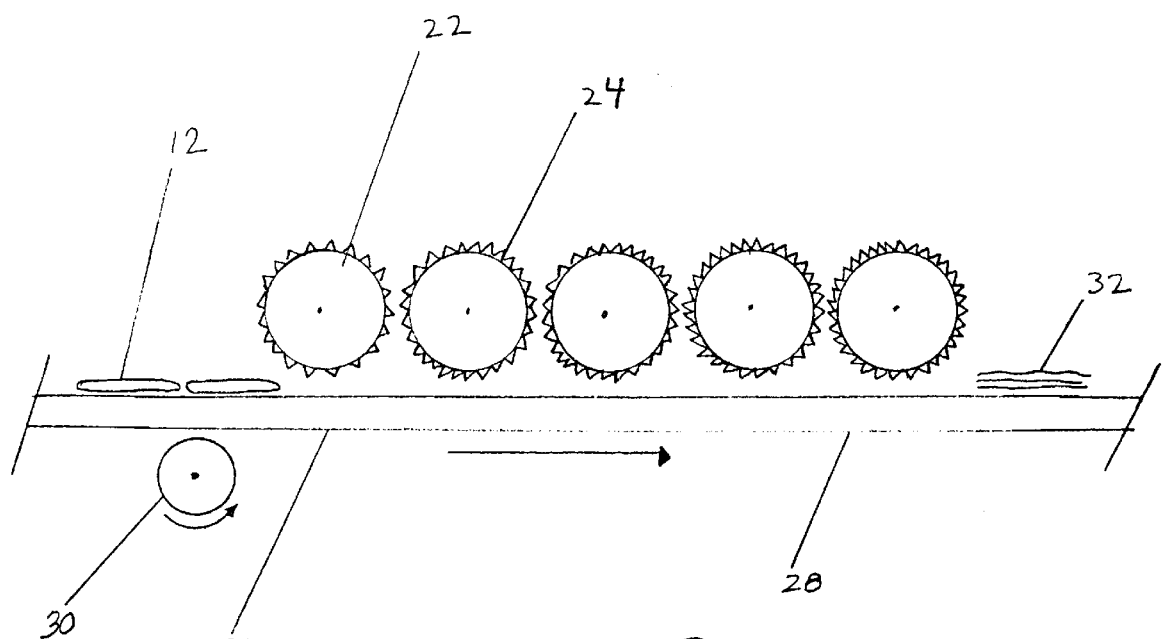
FIG. 2 is a front view of a tearing machine, particularly a rotary-tearing drum having teeth and a feed mechanism.

Referring to FIG. 2, the cut pieces 12 are shredded by a rotary-tearing drum 22 having teeth 24 to shredded fibers 32. A feed mechanism 26 transports the pieces 12 to the rotary-tearing drum 22. The feed mechanism 26 may comprise a feed belt 28 and a pressing roller 30 which rotates and presses against the belt 28 causing motion of the belt 28.

Figure 3:
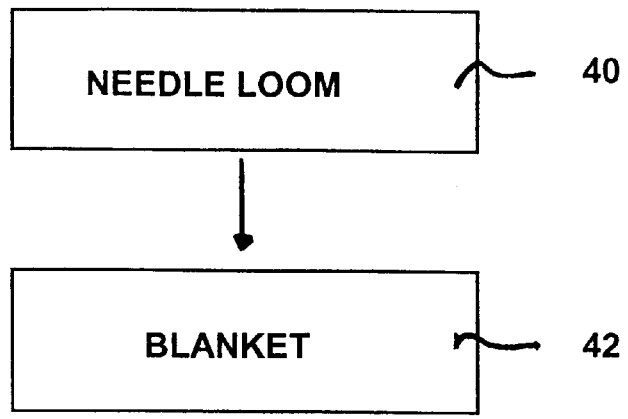
FIG. 3 is a flow chart of an alternate embodiment of the invention for making non-woven products.

Referring to FIG. 3, an alternate embodiment of the invention begins at step 4 in FIG. 1 where air is used to produce a mass of fiber or a batting of fiber. Whether batting or a simple mass of fiber is utilized, the material is supplied to a known needle loom shown at 40 in FIG. 3. This device is also known as a needle punch machine. In this machine, a multiplicity of needles are passed transversely through the batting or mass of fiber to intertwine and entangle the fibers to produce a non-woven yet cohesive product. This product is schematically illustrated at 42 in FIG. 3 and can be used as a blanket or any other non-woven textile. The recycled polyester fiber mass of the present invention can be used alone or in conjunction with a scrim to produce the non-woven product.

While a specific embodiment of the invention has been shown and described in detail to illustrate the application of the principles of the invention, it will be understood that the invention may be embodied without departing from such principles.

What is claimed is:

1. A method of making a recycled polyester fiber product, comprising:
    cutting polyester scraps into cut pieces;
    collecting the cut pieces;
    transporting the cut pieces to a tearing machine;
    shredding the cut pieces in the tearing machine to form shredded fibers; and
    blowing out the shredded fibers to help transport the fibers to form a mass of fibers.

2. A method according to claim 1, including carding the mass of fibers to form a sliver; and
    spinning the sliver into a yarn.

3. A method according to claim 1, including baling the mass of fibers.

4. The method according to claim 1, wherein the cut pieces have an average area of at least two square inches.

5. The method according to claim 1, wherein the cut pieces have an average area up to four square inches.

6. The method according to claim 1, wherein the cut pieces have an average area from two square inches to four square inches.

7. The method according to claim 1, wherein the shredded fibers have an average length of at least 0.5 inches.

8. The method according to claim 1, wherein the shredded fibers have an average length up to 1.5 inches.

9. The method according to claim 1, wherein the shredded fibers have an average length from 0.5 inches to 1.5 inches.

10. The method according to claim 1, including using in the tearing machine, a plurality of rotary-tearing drums having teeth.

11. The method according to claim 10, wherein the tearing machine comprises five rotary-tearing drums.

12. The method according to claim 1, further comprising spraying an anti-static finish on the shredded fibers before the blowing of the shredded fibers.

13. A method according to claim 1, including supplying the mass of fibers to a needle loom and producing a non-woven product containing recycled polyester fibers in the needle loom.

14. A method of making a yarn from recycled polyester fiber, comprising:
    cutting polyester scraps into cut pieces;
    collecting the cut pieces;
    transporting the cut pieces to a tearing machine;
    shredding the cut pieces to form shredded fibers;
    blowing out the shredded fibers to help form a batting of fibers;
    blending the batting of fibers with other fibers to form blended fibers;
    carding the blended fibers;
    extruding the blended fibers to form a sliver; and spinning the sliver into a yarn.

15. The method according to claim 14, wherein the blended fibers comprise at least 70% by volume of the batting of fiber.

16. The method according to claim 14, wherein the blended fibers comprise at least 10% by volume of the natural fibers.

17. The method according to claim 14, wherein the blended fibers are synthetic fibers.

18. The method according to claim 17, wherein the synthetic fibers have a length equal to the length of the fiber in the batting of fiber.

19. The method according to claim 14, wherein the blended fibers are natural fibers have an average length equal to the average length of fiber in the batting of fiber.

20. A yarn prepared by a process comprising the steps of:
    cutting polyester scraps into cut pieces; collecting the cut pieces;
    transporting the cut pieces to a tearing machine;
    shredding the cut pieces to form shredded fibers;
    blowing out the shredded fibers to help form a batting of fibers;
    carding the batting of fibers;

extruding the batting of fibers to form a sliver; and spinning the sliver into the yarn.

21. A non-woven product prepared by a process comprising the steps of:
cutting polyester scraps into cut pieces;
collecting the cut pieces;
transporting the cut pieces to a tearing machine;
shredding the cut pieces to form shredded fibers;
blowing out the shredded fibers to help form a mass of fibers; and
supplying the mass of fibers to a needle loom for producing the non-woven product.

* * * * *